(12) United States Patent
Green et al.

(10) Patent No.: US 11,174,025 B2
(45) Date of Patent: Nov. 16, 2021

(54) METHOD AND SYSTEM FOR DELIVERING GOODS

(71) Applicant: INTERNATIONAL BUSINESS MACHINES CORPORATION, Armonk, NY (US)

(72) Inventors: William J. Green, Cary, NC (US); Sharon T. Spaulding, Highland, NY (US); Marc Henri Coq, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 412 days.

(21) Appl. No.: 16/203,958

(22) Filed: Nov. 29, 2018

(65) Prior Publication Data

US 2020/0172244 A1 Jun. 4, 2020

(51) Int. Cl.
| | | |
|---|---|---|
| *B64D 1/12* | (2006.01) | |
| *B64C 39/02* | (2006.01) | |
| *B64D 1/22* | (2006.01) | |
| *G06Q 10/08* | (2012.01) | |

(52) U.S. Cl.
CPC ............. *B64D 1/12* (2013.01); *B64C 39/024* (2013.01); *B64D 1/22* (2013.01); *G06Q 10/083* (2013.01); *B64C 2201/027* (2013.01); *B64C 2201/108* (2013.01); *B64C 2201/128* (2013.01)

(58) Field of Classification Search
CPC ........ B64C 2201/027; B64C 2201/042; B64C 2201/108; B64C 2201/128; B64C 2201/146; B64C 39/024; B64C 2201/08; B64C 2201/145; B65D 21/00; B65D 21/064; B64D 1/22; B64D 1/12; G06Q 10/083; F16M 11/18; Y02W 30/50
See application file for complete search history.

(56) References Cited

U.S. PATENT DOCUMENTS

| | | | | |
|---|---|---|---|---|
| 3,759,563 A | * | 9/1973 | Kitamura ................. | B25J 9/148 294/198 |
| 4,613,847 A | * | 9/1986 | Scolari ..................... | B60Q 7/00 116/630 |
| 4,763,833 A | * | 8/1988 | Stoll ..................... | B65D 5/2047 217/125 |
| 4,943,099 A | * | 7/1990 | Gabriel ..................... | B66C 1/34 294/110.1 |

(Continued)

FOREIGN PATENT DOCUMENTS

| | | |
|---|---|---|
| WO | 2018085136 A1 | 5/2018 |
| WO | 2018089236 A1 | 5/2018 |

OTHER PUBLICATIONS

U.S. Appl. No. 16/203,969, filed Nov. 29, 2018.
List of IBM Patents or Patent Applications Treated As Related—Date Filed: Nov. 29, 2018, 2 pages.

*Primary Examiner* — Medhat Badawi
(74) *Attorney, Agent, or Firm* — Cantor Colburn LLP; Tihon Poltavets

(57) ABSTRACT

A delivery system includes a drone including a prime mover and a payload attachment system including a selectively deployable magnet, and a reusable tote including a body having a base, sides, and a lid, the reusable tote including an attachment member provided on the lid operable to engage with the selectively deployable magnet.

14 Claims, 5 Drawing Sheets

(56) References Cited

U.S. PATENT DOCUMENTS

| | | | | |
|---|---|---|---|---|
| 4,981,163 A * | 1/1991 | Westlund | A01G 23/083 | 144/24.13 |
| 5,209,538 A * | 5/1993 | Gabruel | B66C 1/28 | 294/118 |
| 5,540,536 A * | 7/1996 | Hoedl | B65D 21/00 | 414/416.09 |
| 5,826,825 A * | 10/1998 | Gabriel | B64D 1/22 | 244/137.1 |
| 7,479,877 B2 * | 1/2009 | Mortenson | G06Q 10/047 | 340/545.6 |
| 7,934,758 B2 * | 5/2011 | Stamey | E02F 3/3663 | 294/106 |
| 8,650,847 B2 * | 2/2014 | Snell | A01D 46/26 | 56/340.1 |
| 8,807,614 B2 * | 8/2014 | Xu | A01G 23/0955 | 294/201 |
| 9,174,733 B1 * | 11/2015 | Burgess | B64D 1/12 | |
| 9,302,770 B2 | 4/2016 | Burgess et al. | | |
| 9,321,531 B1 * | 4/2016 | Takayama | B64C 39/024 | |
| 9,493,238 B2 | 11/2016 | Takayama et al. | | |
| 9,576,264 B2 * | 2/2017 | Bolene | G06K 7/1413 | |
| 9,580,173 B1 * | 2/2017 | Burgess | B64D 1/22 | |
| 9,630,715 B2 | 4/2017 | Takayama et al. | | |
| 9,650,136 B1 * | 5/2017 | Haskin | B64C 39/024 | |
| 9,764,836 B1 * | 9/2017 | Elzinga | B64C 39/024 | |
| 9,783,295 B2 | 10/2017 | Takayama et al. | | |
| 9,840,339 B1 * | 12/2017 | O'Brien | B64D 47/02 | |
| 9,975,651 B1 * | 5/2018 | Eck | B65G 67/04 | |
| 10,239,638 B1 * | 3/2019 | Cohen | B64F 1/222 | |
| 10,242,333 B1 * | 3/2019 | Colucci, III | G06Q 10/083 | |
| 10,338,609 B2 * | 7/2019 | Obaidi | G08G 5/045 | |
| 10,410,105 B1 * | 9/2019 | Stoman | B64D 9/00 | |
| 10,479,503 B2 * | 11/2019 | Sikora | B64D 1/22 | |
| 10,689,107 B2 * | 6/2020 | Angel | F16M 13/027 | |
| 10,773,906 B1 * | 9/2020 | Mohammed | B65G 59/10 | |
| 2002/0178074 A1 * | 11/2002 | Bloom | G06Q 10/08 | 705/26.81 |
| 2004/0226850 A1 * | 11/2004 | Behnke | B65D 5/3628 | 206/514 |
| 2004/0227630 A1 * | 11/2004 | Shannon | G08B 13/2462 | 340/539.22 |
| 2005/0046567 A1 * | 3/2005 | Mortenson | G08B 21/18 | 340/539.13 |
| 2007/0221721 A1 * | 9/2007 | Bradford | B65D 21/0213 | 229/199 |
| 2010/0051890 A1 * | 3/2010 | Lauder | B66D 1/22 | 254/382 |
| 2011/0210135 A1 * | 9/2011 | Huff | B65D 55/14 | 220/780 |
| 2011/0320376 A1 * | 12/2011 | Dearlove | G06Q 10/08 | 705/337 |
| 2013/0146556 A1 * | 6/2013 | Cameron | B66C 23/28 | 212/276 |
| 2013/0299046 A1 * | 11/2013 | Helenius | A01G 3/08 | 144/343 |
| 2014/0032034 A1 * | 1/2014 | Raptopoulos | G05D 1/0088 | 701/25 |
| 2014/0166516 A1 * | 6/2014 | Martinez | A45C 3/001 | 206/372 |
| 2014/0346072 A1 * | 11/2014 | Jacobson | B65B 5/04 | 206/438 |
| 2015/0151837 A1 * | 6/2015 | Sane | B64D 1/12 | 701/3 |
| 2015/0158599 A1 * | 6/2015 | Sisko | B64F 1/20 | 244/114 R |
| 2015/0175276 A1 * | 6/2015 | Koster | B64C 39/024 | 244/114 R |
| 2016/0059963 A1 | 3/2016 | Burgess et al. | | |
| 2016/0196756 A1 * | 7/2016 | Prakash | G08G 5/025 | 701/3 |
| 2016/0221671 A1 * | 8/2016 | Fisher | B64C 27/08 | |
| 2016/0236778 A1 | 8/2016 | Takayama et al. | | |
| 2017/0043871 A1 | 2/2017 | Takayama et al. | | |
| 2017/0043953 A1 * | 2/2017 | Battles | G06Q 10/087 | |
| 2017/0106978 A1 * | 4/2017 | Sopper | B65D 5/4208 | |
| 2017/0253334 A1 | 9/2017 | Takayama et al. | | |
| 2017/0267348 A1 * | 9/2017 | Sweeny | A47J 47/14 | |
| 2017/0283056 A1 * | 10/2017 | Mons | B64D 1/22 | |
| 2017/0320572 A1 * | 11/2017 | High | G05D 1/0011 | |
| 2017/0334561 A1 * | 11/2017 | Sopper | B64D 1/22 | |
| 2017/0361928 A1 * | 12/2017 | Matsuda | B64C 39/024 | |
| 2018/0072419 A1 * | 3/2018 | Burgess | B64C 39/024 | |
| 2018/0282014 A1 * | 10/2018 | Atchley | G06Q 50/28 | |
| 2018/0312306 A1 * | 11/2018 | Caswell | B65D 51/249 | |
| 2019/0135512 A1 * | 5/2019 | Kooc | B65D 71/42 | |
| 2019/0168913 A1 * | 6/2019 | Brantley | A47B 87/007 | |
| 2019/0196512 A1 * | 6/2019 | Blake | G06Q 10/06315 | |
| 2019/0256210 A1 * | 8/2019 | Prager | B64C 39/024 | |
| 2019/0270537 A1 * | 9/2019 | Amend, Jr. | B65D 5/4212 | |
| 2019/0289907 A1 * | 9/2019 | Van Lancker | B65D 31/10 | |
| 2019/0315512 A1 * | 10/2019 | Smith | B65D 5/2038 | |
| 2019/0374004 A1 * | 12/2019 | Martins | A45D 33/24 | |
| 2020/0035127 A1 * | 1/2020 | Sullivan | G09B 23/303 | |
| 2020/0165007 A1 * | 5/2020 | Augugliaro | H02J 7/0042 | |
| 2020/0165055 A1 * | 5/2020 | Barfoot | B65D 21/0209 | |
| 2020/0172241 A1 * | 6/2020 | Green | B64C 39/024 | |
| 2020/0235603 A1 * | 7/2020 | Park | G01R 33/07 | |

\* cited by examiner

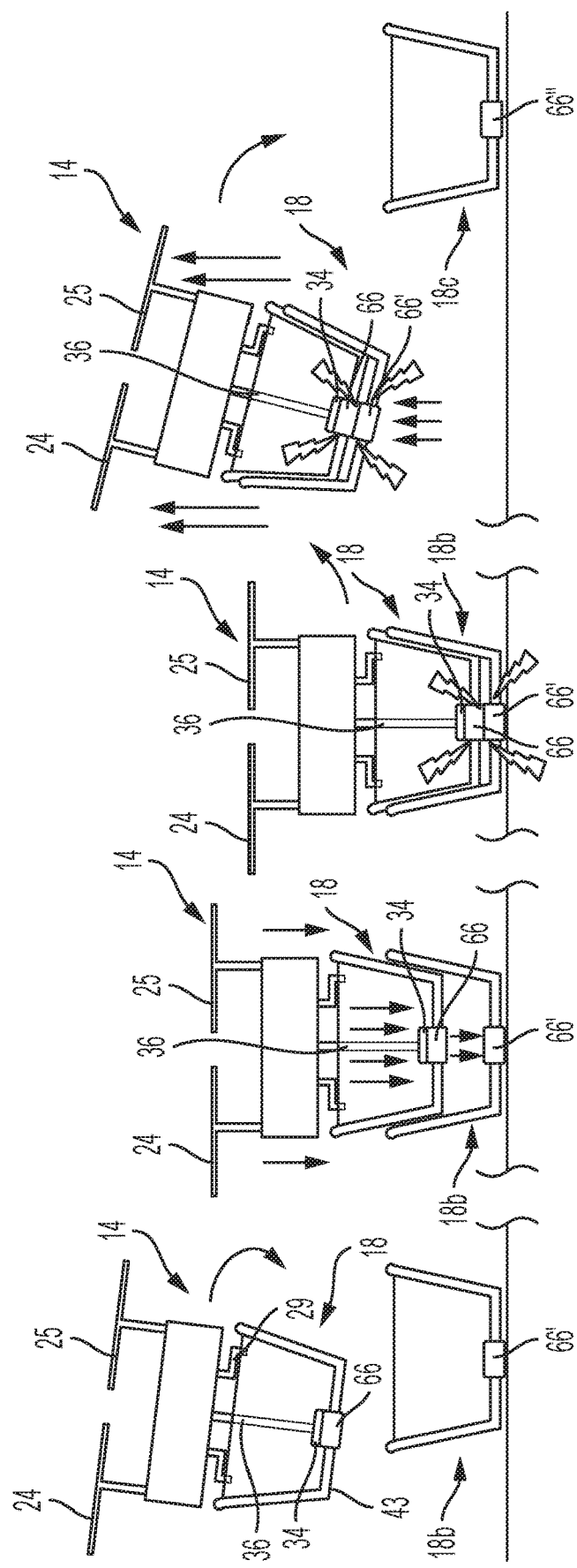

METHOD AND SYSTEM FOR DELIVERING GOODS

BACKGROUND

The present invention relates to the art of delivery systems, and more specifically, to method and system for delivering goods.

Over the years, various systems have been developed to deliver goods to consumers. Systems have included vehicles that have ranged from cars, trucks, vans, trains, planes, and the like. Currently, merchants and other sources of goods are exploring drone technology for delivering goods to consumers. A drone may be configured to transport a good to, for example, a home, or a shared drop off spot. The use of drones could alleviate traffic on surface streets and, by using electrical energy, could also lead to a reduction in pollution.

SUMMARY

According to an aspect of an exemplary embodiment of the present invention, a delivery system includes a drone including a prime mover and a payload attachment system including a selectively deployable magnet, and a reusable tote including a body having a base, sides, and a lid, the reusable tote including an attachment member provided on the lid operable to engage with the selectively deployable magnet.

According to another aspect of an exemplary embodiment, a reusable tote includes a body having a base, sides, and a lid. The reusable tote including an attachment member provided on the lid operable to engage with a magnet.

According to yet another aspect of an exemplary embodiment, a method of delivering goods includes connecting a drone with a reusable tote by engaging a magnet supported by the drone with an attachment member provided on the reusable tote, transporting the reusable tote to a destination, and disengaging the magnet from the attachment member.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 13a depicts a drone supporting a reusable tote approaching another reusable tote, in accordance with an aspect of an exemplary embodiment;

FIG. 13b depicts the drone of FIG. 13a introducing the reusable tote into the another reusable tote, in accordance with an aspect of an exemplary embodiment;

FIG. 13c depicts the drone of FIG. 13b connecting the reusable tote to the another reusable tote, in accordance with an aspect of an exemplary embodiment; and FIG. 13d depicts the drone FIG. 13c carrying the reusable tote and the another reusable tote to yet another reusable tote, in accordance with an aspect of an exemplary embodiment.

DETAILED DESCRIPTION

Figure 1:
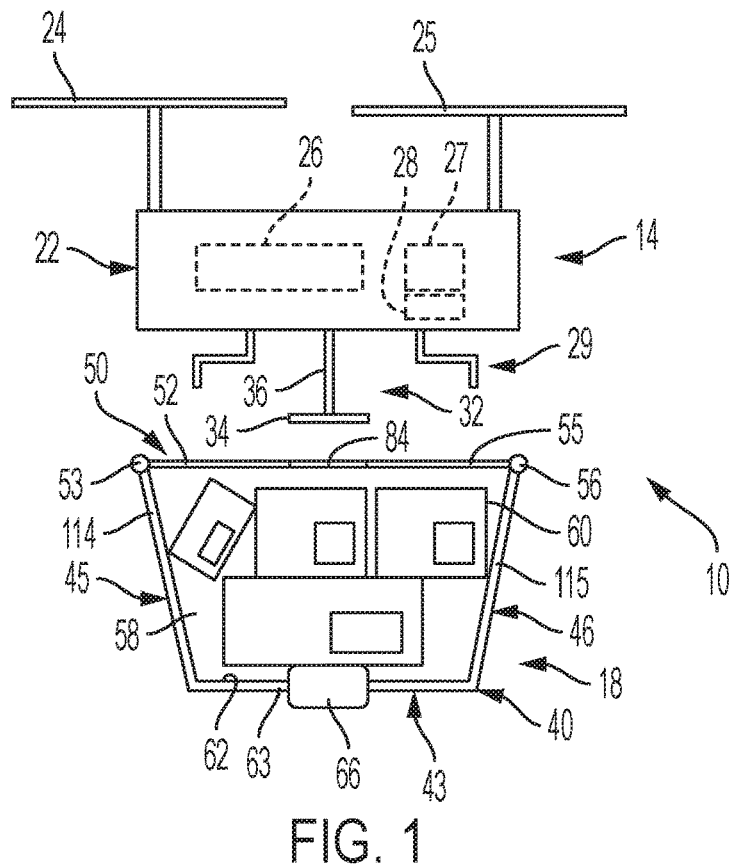
FIG. 1 depicts a system for delivering goods illustrating a drone approaching a reusable tote, in accordance with an aspect of an exemplary embodiment.
Figure 2:
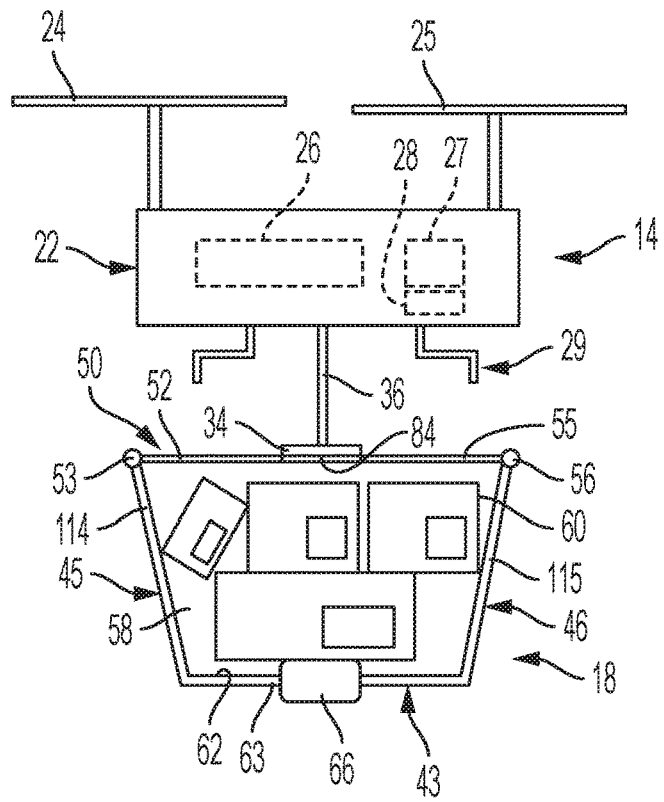
FIG. 2 depicts the system of FIG. 1 illustrating the drone connecting with the reusable tote, in accordance with an aspect of an exemplary embodiment.

A system for delivering goods, in accordance with an exemplary embodiment, is indicated generally at 10 in FIGS. 1 and 2. System 10 includes a drone or remotely piloted vehicle (RPV) 14 that may selectively connect with, deliver, and retrieve one or more reusable totes 18. Drone 14 includes a body 22 that supports a first rotor 24 and a second rotor 25 that are coupled to a prime mover 26. It should be understood that the number and location of rotors may vary. Body 22 may also support a navigation system 27 that may include a global positioning system (GPS) (not separately labeled) and a control system 28. Drone 14 also include ground supports 29. In an embodiment, drone 14 includes a payload attachment system 32 that may include a magnet 34 that is coupled to a selectively extendable magnet support 36. Selectively extendable magnet support 36 is connected to control system 28 and selectively deployed to deliver and/or retrieve goods as will be detailed herein.

In an embodiment, each reusable tote 18 includes a tote body 40 having a base 43, a first side 45, a second side 46 a third side (not separately labeled) and a fourth side (not shown). Reusable tote 18 includes a lid 50 connected to tote body 40. Reusable totes 18 may take on various forms. In the embodiment shown, first, second, third and fourth sides are angular. For example, first and second sides 45 and 46, and third and fourth sides may be define a trapezoidal shape while base 43 and lid 50 may be generally rectangular. However, it should be understood that totes 18 may take on various other configurations that enable stacking and/or nesting including round, oval, or the like.

Lid 50 includes a first lid member 52 connected to first side 45 through a first hinge 53 and a second lid member 55 connected to second side 46 through a second hinge 56. Tote body 40 defines an interior zone 58 that may retain one or more goods 60. In the embodiment shown, base 43 includes a first or inner surface 62 and a second or outer surface 63. A tote connector system which may take the form of a magnet member 66 is provided on base 43 and may extend from interior zone 58 through outer surface 63.

Figure 3:
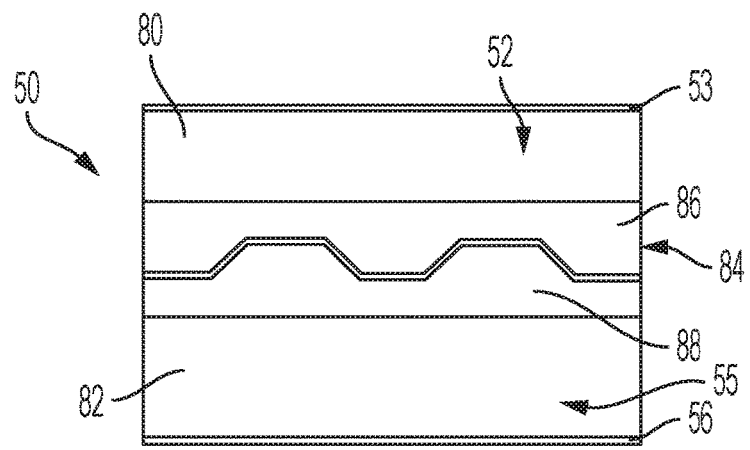
FIG. 3 depicts a lid of the reusable tote, in accordance with an aspect of an exemplary embodiment.

Reference will now follow to FIG. 3 in describing lid 50 in accordance with an aspect of an exemplary embodiment.

First lid member 52 includes a first outer surface 80 and a second lid member 55 includes a second outer surface 82. An attachment member 84 that may interface with magnet 34 on drone 14 is provided on lid 50. Attachment member 84 includes a first attachment element 86 arranged on first outer surface 80 and a second attachment element 88 is arranged on second outer surface 82. First attachment member 86 may inter-engage with second attachment element 88 to secure first lid member 52 to second lid member 55.

Figure 4:
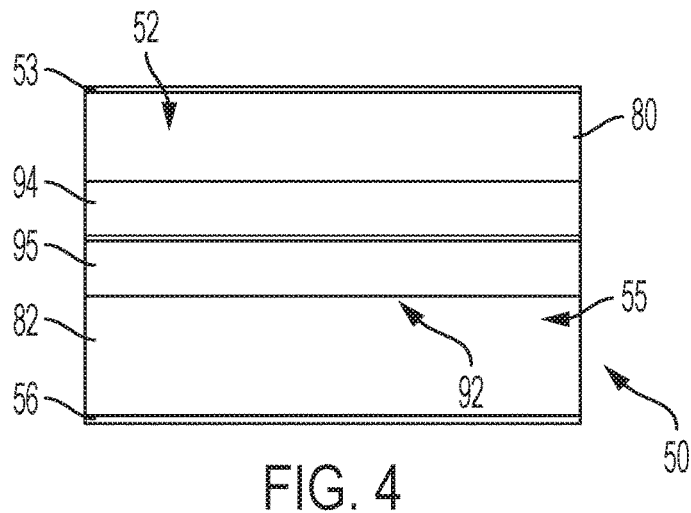
FIG. 4 depicts a lid of the reusable tote, in accordance with another aspect of an exemplary embodiment.
Figure 6:
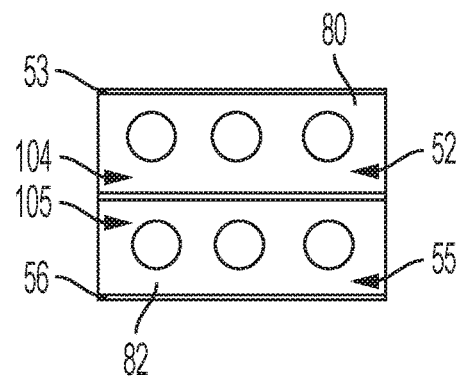
FIG. 6 depicts a lid of the reusable tote, in accordance with still yet another aspect of an exemplary embodiment.
Figure 5:
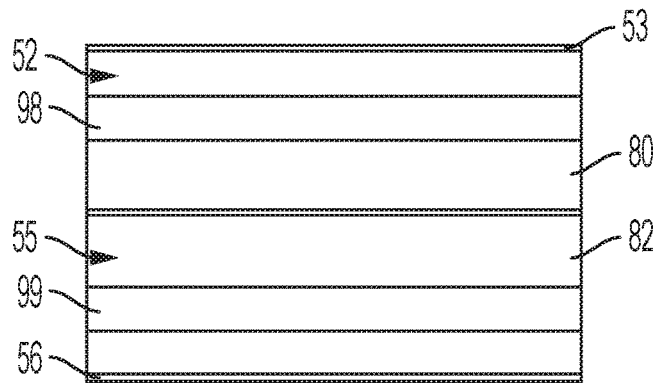
FIG. 5 depicts a lid of the reusable tote, in accordance with yet another aspect of an exemplary embodiment.
Figure 7:
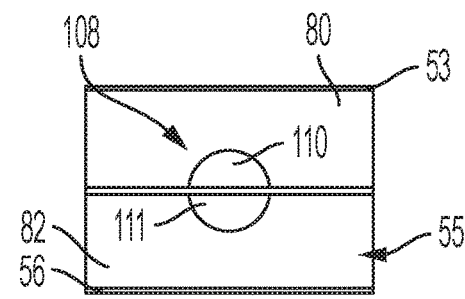
FIG. 7 depicts a lid of the reusable tote, in accordance with yet still another aspect of an exemplary embodiment.

Referring to FIG. 4, wherein like reference numbers represent corresponding parts in the respective views, lid 50 is shown to include an attachment member 92 including a first attachment element 94 and a second attachment element 95. First and second attachment elements 94 and 95 may include magnets that inter-engage to secure lid 50 in a closed configuration and also interface with magnet 34. In FIG. 5, an attachment member (not separately labeled) includes first and second attachment elements 98 and 99 shown extending along corresponding ones of first and second outer surfaces 80 and 82 spaced one from another. First and second attachment elements 98 and 99 may be formed from metal or be magnetic so as to interface with one another and with magnet 34. In FIG. 6, first outer surface 80 is shown to include a first plurality of attachment members 104 and second outer surface 82 is shown to include a second plurality of attachment members 105. First plurality of attachment members 104 and second plurality of attachment members 105 are formed from a material that may be connected with magnet 34. In FIG. 7, an attachment member 108 is shown to include first and second attachment elements 110 and 111 that generally form a circle when first lid member 52 and second lid member 55 are closed. First and second attachment elements 110 and 111 may be magnetic so as to interface with one another and with magnet 34 34.

Figure 8:
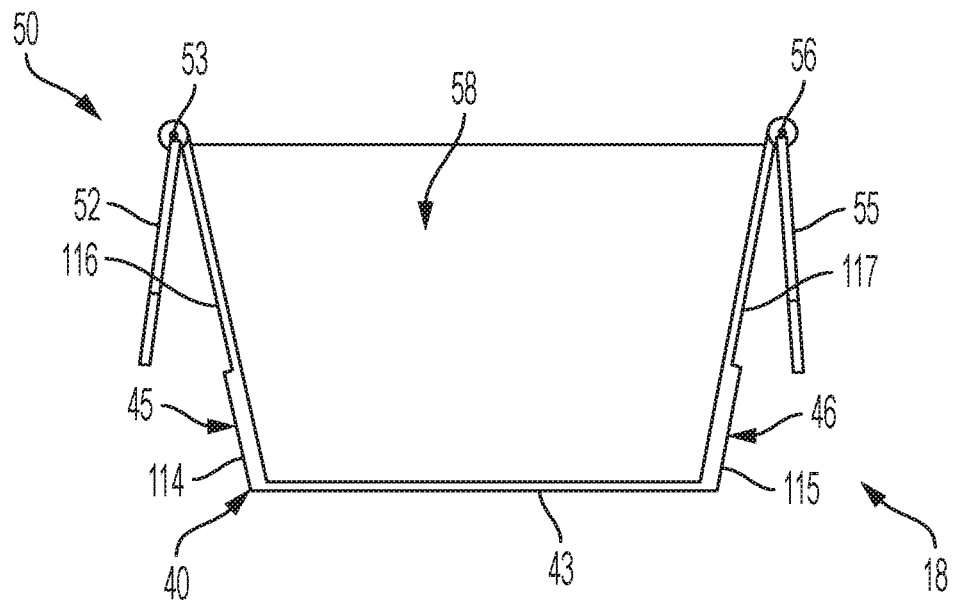
FIG. 8 depicts an end view of the reusable tote with lids in an un-stowed configuration, in accordance with an aspect of an exemplary embodiment.
Figure 9:
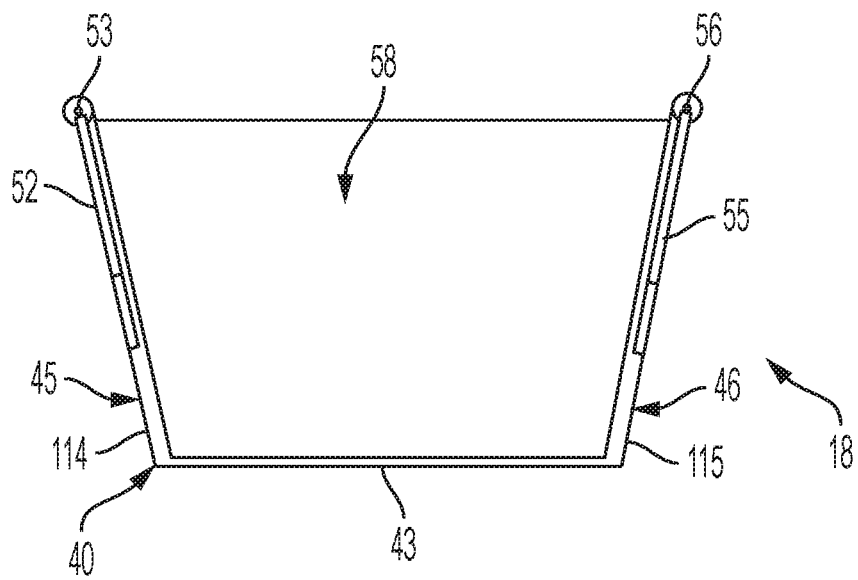
FIG. 9 depicts the end view of the reusable tote of FIG. 8 with the lids in a stowed configuration, in accordance with an aspect of an exemplary embodiment.

Reference will now follow to FIGS. 8 and 9, wherein like reference numbers represent corresponding parts in the respective views, in describing lid member retainers (not separately labeled) in accordance with an aspect of an exemplary embodiment. First side 45 of reusable tote 18 includes a first outer surface 114 and second side 46 of reusable tote 18 includes a second outer surface 115. First outer surface 114 includes a first lid receiving zone shown in the form of a first recess 116 and second outer surface 115 includes a second lid receiving zone shown in the form of a second recess 117.

First recess 116 is receptive of first lid member 52 while second recess 117 is receptive of second lid member 55 such as shown in FIG. 9. Each recess 116, 117 may include a magnet that engages with a corresponding attachment element to maintain first and second lid members 52 and 55 in a stowed configuration. Of course, reusable tote 18 may include other devices for retaining first and second lid members 52 and 55.

Figure 10:
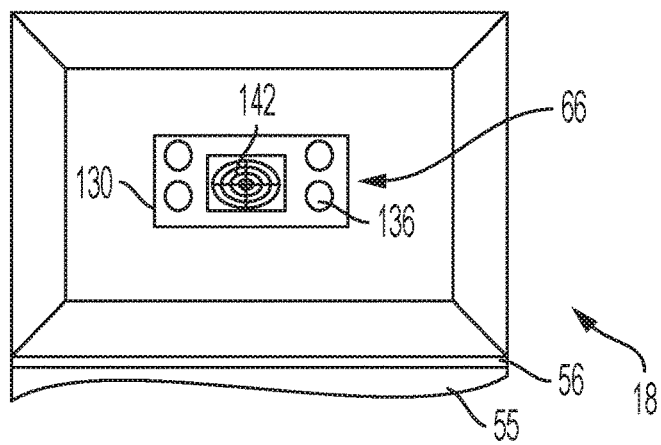
FIG. 10 depicts a top view of an interior magnet system, in accordance with an aspect of an exemplary embodiment.
Figure 11:
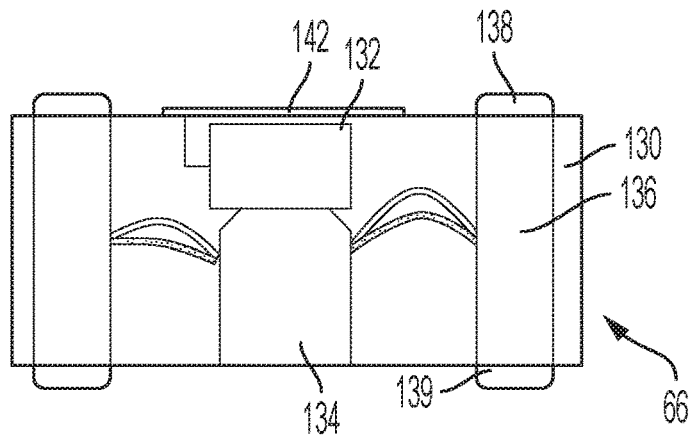
FIG. 11 depicts a side view of the interior magnet system of FIG. 10, in accordance with an aspect of an exemplary embodiment.

Reference will now follow to FIGS. 10 and 11 in describing tote connecting system 66 in accordance with an aspect of an exemplary embodiment. Tote connecting system 66 includes a housing 130 that is supported by base 43. Housing 130 surrounds a control module 132 that may selectively communicate with drone 14 and power supply that could take the form of a rechargeable battery 134. Tote connecting system 66 includes a plurality of magnets, one of which is indicated at 136. Each magnet 136 includes a first end 138 that is exposed in interior zone 58 and a second end 139 that projects outwardly of base 43. Magnets 136 may take the form of electro-magnets that are connected to batteries 134 and selectively activated by control module 132. Tote connecting system 66 may also include an address member 142 that may provide an address signal that could take the form of one or more of a visual signal and a wireless signal that may be read at drone 14.

Figure 12:
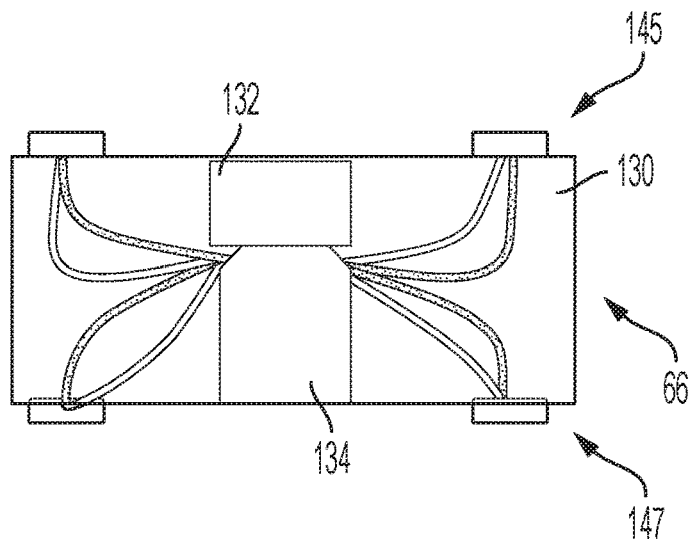
FIG. 12 depicts a side view of an interior magnet system, in accordance with another aspect of an exemplary embodiment.

In FIG. 12, tote magnet member 66 is shown to include a first plurality of magnets 145 that may be arranged in interior zone 58 and a second plurality of magnets 147 that are arranged externally of base 43. First and second plurality of magnets 145 and 147 are separately connected to battery 134 and may be independently activated by control module 132. In this manner, second plurality of magnets 147 may be activated only when it is desired to connect with another reusable tote as will be detailed herein. The separate connections reduce power consumption for battery 134 thereby extending an overall operational life per charge.

Reference will now follow to FIGS. 13*a*-13*d* and with continued reference to FIGS. 1 and 2, in describing a method of delivering goods and retrieving reusable totes in accordance with an exemplary embodiment. Goods may be dropped off by drone 14 such as shown in FIG. 2. Once delivered, drone 14 may disengage from reusable tote 18. At this point, drone 14 may be sent to collect empty reusable totes. After connecting to a first reusable tote 18 through, for example, tote connecting system 66, as shown in FIG. 13*a*. Drone 14 may then carry reusable tote 18 to another reusable tote 18*b*.

As shown in FIG. 13*b*, drone 14 may employ address member 142 to location and establish a desired position relative to second tote 18*b*. Drone 14 may then insert reusable tote 18 into reusable tote 18*b* and activate magnets 136 to connect with a tote magnet member 66*b* in second reusable tote 18*b* as shown in FIG. 13*c*. Drone 14 may then transport first and second reusable totes 18 and 18*b* to another reusable tote 18*c* such as shown in FIG. 13*d* and connect thereto. Drone 14 may navigate to a selected tote drop off point, or may return to each good delivery destination to retrieve totes. That is, after delivering goods, drone 14 may be used to retrieve empty totes that may be staged for return.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment of the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A reusable tote comprising:
a body having a base, sides, and a lid including a first lid member and a second lid member, the reusable tote including an attachment member provided on the lid operable to engage with a magnet and a magnet member arranged in the base, the magnet member is operable to connect the reusable tote with another reusable tote, wherein the first side includes a first outer surface including a first recess and the second side includes a second outer surface including a second recess, the first recess defining a first lid member receiving zone that selectively receives the first lid member and the second recess defining a second lid member receiving zone that selectively receives the second lid member.

2. The reusable tote according to claim 1, wherein the attachment member includes a first attachment member mounted to the first lid member and a second attachment member mounted to the second lid member.

3. The reusable tote according to claim 2, wherein the first attachment member operatively connects with the second attachment member to close the lid.

4. The reusable tote according to claim 1, wherein the sides include a first side and a second, opposing side, the first lid member being mounted to the first side through a first hinge and the second lid member is mounted to the second side through a second hinge.

5. The reusable tote according to claim 1, further comprising: an address member that outputs an address signal to a drone.

6. The reusable tote according to claim 5, further comprising: a tote connecting system arranged at the base, wherein the address member is packaged with the tote connecting system.

7. The reusable tote according to claim 6, wherein the attachment member comprises an electro-magnet, the reusable tote including a power supply that is operatively connected to the electro-magnet and the address member.

8. The reusable tote according to claim 5, wherein the address member presents at least one of a visual signal and a wireless signal to the drone.

9. A method of delivering goods comprising:
forming a plurality of nested reusable totes each having a body having a base, a first side a second side, and a lid including a first lid member and a second lid member, the first side including a first recess receptive of the first lid member and the second side including a second recess receptive of the second lid member;
connecting a drone with an uppermost one of the plurality of nested reusable totes connected one to another through a magnet member disposed on the base of each of the plurality of nested totes by engaging a magnet supported by the drone with an attachment member provided on the reusable tote;
transporting the plurality of nested reusable totes to a destination; and
disengaging the magnet from the attachment member.

10. The method of claim 9, wherein connecting the drone with the plurality of nested reusable totes includes extending the magnet outwardly of the drone.

11. The method of claim 9, retrieving the plurality of nested reusable totes from the destination.

12. The method of claim 11, wherein retrieving the plurality of nested reusable totes includes detecting a signal from at least one of the plurality of nested reusable totes.

13. The method of claim 12, wherein detecting the signal includes receiving one of a visual signal and a wireless signal from the at least one of the plurality of nested reusable totes.

14. The reusable tote according to claim 1, further comprising:
a drone including a prime mover and a payload attachment system including a selectively deployable magnet operable to engage with the attachment member.

* * * * *